US012373516B2

(12) United States Patent
Rizk

(10) Patent No.: US 12,373,516 B2
(45) Date of Patent: Jul. 29, 2025

(54) SYSTEMS AND METHODS FOR PROVIDING RECOMMENDATIONS OF COMPUTER APPLICATIONS BASED ON SIMILARITY

(71) Applicant: SHOPIFY INC., Ottawa (CA)

(72) Inventor: Paul Rizk, Toronto (CA)

(73) Assignee: SHOPIFY INC., Ottawa (CA)

( * ) Notice: Subject to any disclaimer, the term of this patent is extended or adjusted under 35 U.S.C. 154(b) by 988 days.

(21) Appl. No.: 17/476,335

(22) Filed: Sep. 15, 2021

(65) Prior Publication Data

US 2023/0078260 A1   Mar. 16, 2023

(51) Int. Cl.
| | |
|---|---|
| *G06N 3/04* | (2023.01) |
| *G06F 18/213* | (2023.01) |
| *G06F 18/22* | (2023.01) |
| *G06F 18/23213* | (2023.01) |
| *G06N 3/08* | (2023.01) |
| *G06Q 30/00* | (2023.01) |

(52) U.S. Cl.
CPC ...... *G06F 18/23213* (2023.01); *G06F 18/213* (2023.01); *G06F 18/22* (2023.01); *G06N 3/04* (2013.01); *G06N 3/08* (2013.01); *G06Q 30/00* (2013.01)

(58) Field of Classification Search
None
See application file for complete search history.

(56) References Cited

U.S. PATENT DOCUMENTS

| | | | | |
|---|---|---|---|---|
| 11,853,877 | B2 * | 12/2023 | Watson | G06N 3/04 |
| 2019/0378051 | A1 * | 12/2019 | Widmann | G06N 20/00 |
| 2021/0089603 | A1 * | 3/2021 | Abbasi Moghaddam | |
| | | | | G06F 16/9535 |
| 2021/0303638 | A1 * | 9/2021 | Zhong | G06F 40/169 |
| 2022/0237467 | A1 * | 7/2022 | Ravishankar | G06N 3/088 |
| 2022/0284288 | A1 * | 9/2022 | Tolias | G06N 3/08 |

OTHER PUBLICATIONS

Sheela et al. (Sheela)"Review on Methods to Fix Number of Hidden Neurons in Neural Networks" Hindawi Publishing Corporation Mathematical Problems in Engineering vol. 2013, Article ID 425740, 11 pages http://dx.doi.org/10.1155/2013/425740 (Year: 2013).*

* cited by examiner

*Primary Examiner* — Xuyang Xia

(57) ABSTRACT

Systems, methods and computer readable medium are provided for generating recommendations of computer applications for entities including: receiving, at an input of a neural network model, a set of input features for characteristics of a set of entities; automatically selecting a middle layer of the model from amongst one or more hidden layers; determining values at the middle layer for entities corresponding to output values of the nodes of the middle layer; measuring similarity distances for a first entity as compared to other entities of the set of entities based on distance between the corresponding values at the middle layer; identifying a similar entity to the first entity based on the measured similarity distance for the first entity to the similar entity being the shortest of the measured similarity distances; and providing a recommendation for a computer application for the first entity based on the similar entity.

20 Claims, 7 Drawing Sheets

FIG. 2

SYSTEMS AND METHODS FOR PROVIDING RECOMMENDATIONS OF COMPUTER APPLICATIONS BASED ON SIMILARITY

FIELD

The present application relates to the generation of recommendations of computer applications of relevance based on similar online entities, such as for e-commerce.

BACKGROUND

When users interact with digital content online such as shopping online; digesting online streaming content; downloading applications, etc., there is a need for online platforms (e.g. websites) to provide useful recommendations of other online content that may be of relevance to them.

SUMMARY

Providing recommendations is often performed by determining similarities between online entities (e.g. e-commerce merchants). The determination of how similar entities are in an online environment can help inform the likelihood that these entities will share similar responses to a particular recommendation of digital content. Such recommendations may provide suggestions to online users based on learned behaviours of other users, e.g. to suggest a new app from an app store; or suggest other online products of interest.

Generally, inaccurate or irrelevant recommendations provided to users in an online environment can lead to disengagement of users from the online entities which they interact with, such as web merchants and result in a negative online experience. In at least some embodiments, the present disclosure is aimed at improving the speed, accuracy and relevance of computer application recommendation(s) for entities by intelligently determining the most appropriate computer application(s) to recommend based on an accurate and dynamic analysis of similar online entities, such as e-commerce merchants to provide such recommendations.

In accordance with exemplary and non-limiting embodiments, there is provided a computer-implemented method for providing recommendations of computer applications for entities, the method comprising: receiving, at an input of a neural network model, a set of input features corresponding to characteristics associated with a set of entities, the neural network model for predicting an affinity to at least one computer application; automatically selecting a middle layer of the neural network model from amongst one or more hidden layers of the neural network model, the hidden layers being layers between the input of the neural network model and an output of the neural network model; determining values at the middle layer, for entities of the set of entities corresponding to output values of the nodes of the middle layer when the neural network model is run for those entities; measuring similarity distances for a first entity of the set of entities as compared to other entities of the set of entities based on distance between the values at the middle layer for that entity and values at the middle layer for the other entities of the set of entities; identifying a similar entity of the set of entities to the first entity based on the measured similarity distance for the first entity as compared to the similar entity being the shortest of the measured similarity distances for the first entity; and providing a recommendation for a computer application for the first entity to a computing device associated therewith, the recommendation based on the similar entity of the set of entities.

The method may be configured for performing clustering of the entities based on the similarity distances between them in order to identify groups of entities related to one another, wherein the recommendation is further based on a commonality between entities of an identified group of entities including the first entity.

The clustering may classify the entities into similar groups by employing at one of: K-means nearest neighbor approach; spectral clustering; agglomerative clustering; affinity propagation; mean shift; density-based spatial clustering of applications with noise (DBSCAN); and ordering points to identify cluster structure (OPTICS).

In at least some aspects, the values at the middle layer for each entity is mapped to a position in a continuous multi-dimensional space and the distance calculated is a Euclidean distance measurement within that continuous multidimensional space.

In at least some aspects, the neural network model is trained for a particular use of predicting interest of the entities in the at least one computer application from available applications, and the set of input features is processed to contain only features relevant to the particular use.

In at least some aspects, the neural network is an artificial neural network having at least one hidden middle layer.

In at least some aspects, the method further comprises, performing ranking of similarity distances between the first entity and other entities in the set of entities and providing a similar recommendation of computer applications of relevance to those entities ranked as having a similarity distance less than a defined threshold.

In at least some aspects, the method further comprises calculating other similarity distances between at least one additional hidden layer of the neural network for the first entity and a corresponding hidden layer for the other entities of the set of entities; and performing an average of the similarity distances for the middle layer and the other similarity distances calculated between the hidden layers, wherein the provided recommendation is further based on the average.

In at least some aspects, the recommendation for the first entity is further based on determining from the similar entity, at least one of: a set of output recommendations for other computer applications associated with the similar entity at an output of the neural network model; and identifying events indicating other computer applications interacted with or installed by the similar entity.

In at least some aspects, the method, further comprises: instructing the computing device to display the recommendation associated with a description of a reasoning for the recommendation, comprising: the recommendation based on an identified similarity between the first entity and the similar entity; and a description of an interaction of the similar entity with the other computer applications.

In at least some aspects, automatically selecting the middle layer of the neural network model from amongst one or more hidden layers of the neural network model, further comprises: a particular layer located between layers corresponding to the input and the output that is a smallest point of convergence in the hidden layers having a smallest number of nodes prior to a divergence in the neural network model; or if no smallest point of convergence exists in the neural network model, then the middle layer is situated in the middle of the hidden layers by count of a number of layers in the hidden layers.

In accordance with exemplary and non-limiting embodiments, there is provided a computer readable medium having instructions tangibly stored thereon, wherein the instructions, when executed cause a system to: receive, at an input of a neural network model, a set of input features corresponding to characteristics associated with a set of entities, the neural network model for predicting an affinity to at least one computer application; automatically select a middle layer of the neural network model from amongst one or more hidden layers of the neural network model, the hidden layers being layers between the input of the neural network model and an output of the neural network model; determine values at the middle layer, for entities of the set of entities corresponding to output values of the nodes of the middle layer when the neural network model is run for those entities; measure similarity distances for a first entity of the set of entities as compared to other entities of the set of entities based on distance between the values at the middle layer for that entity and values at the middle layer for the other entities of the set of entities; identify a similar entity of the set of entities to the first entity based on the measured similarity distance for the first entity as compared to the similar entity being the shortest of the measured similarity distances for the first entity; and provide a recommendation for a computer application for the first entity to a computing device associated therewith, the recommendation based on the similar entity of the set of entities.

In accordance with exemplary and non-limiting embodiments, there is provided a computer system for providing recommendations of computer applications for entities, the computer system comprising: a processor in communication with a storage, the processor configured to execute instructions stored on the storage to cause the system to: receive, at an input of a neural network model, a set of input features corresponding to characteristics associated with a set of entities, the neural network model for predicting an affinity to at least one computer application; automatically select a middle layer of the neural network model from amongst one or more hidden layers of the neural network model, the hidden layers being layers between the input of the neural network model and an output of the neural network model; determine values at the middle layer, for entities of the set of entities corresponding to output values of the nodes of the middle layer when the neural network model is run for those entities; measure similarity distances for a first entity of the set of entities as compared to other entities of the set of entities based on distance between the values at the middle layer for that entity and values at the middle layer for the other entities of the set of entities; identify a similar entity of the set of entities to the first entity based on the measured similarity distance for the first entity as compared to the similar entity being the shortest of the measured similarity distances for the first entity; and provide a recommendation for a computer application for the first entity to a computing device associated therewith, the recommendation based on the similar entity of the set of entities.

BRIEF DESCRIPTION OF THE DRAWINGS

Embodiments will be described, by way of example only, with reference to the accompanying figures wherein:

FIG. 2 is an example of a home page of an administrator, according to one embodiment;

DESCRIPTION

Figure 1:
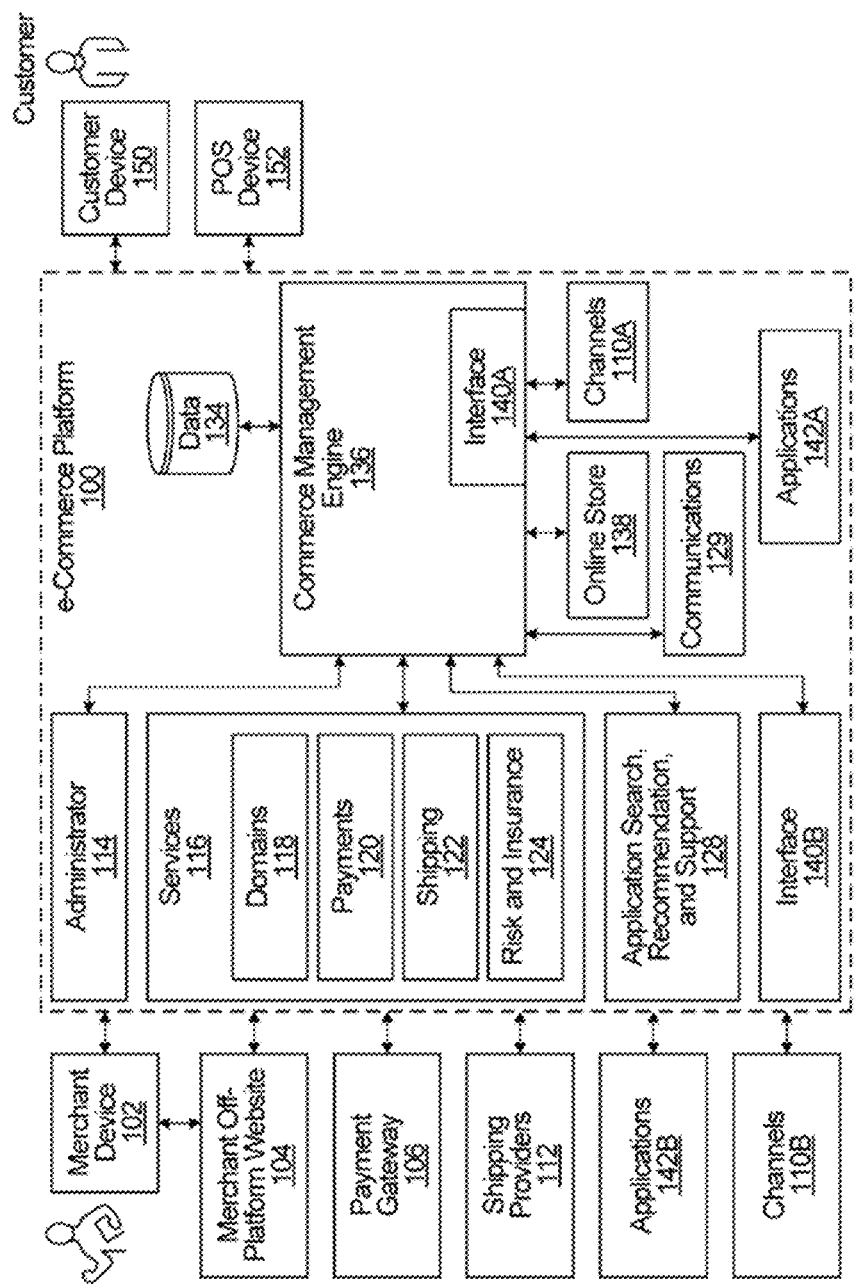
FIG. 1 is a block diagram of an e-commerce platform, according to one embodiment.

In at least some embodiments, it would be advantageous to reduce the processing time and save computing resources associated with inefficient and inaccurate determination of similarities between online resources (e.g. e-commerce merchants) which can lead to inaccurate and ineffective application software recommendations for an online application store. In at least some embodiments, there is provided a method and system for improving the efficiency of application store recommendations using a neural network model to determine when online users or entities are similar to one another.

For example, if an online merchant A is similar to merchant B, and merchant B prefers using application X over application Y, then merchant A may be likely to be more receptive to a recommendation based on application X than to application Y.

Similarity is typically determined by selecting a set of characteristics of the entities and then directly measuring a distance between the two entities based on each entity's respective values for those characteristics. The shorter the distance between two entities, the more similar they are to each other. In some cases, the characteristics of users for comparison may have a combination of discrete values (e.g. numerical codes for each country) and continuous values (e.g. gross merchandise value—GMV). The gross merchandise value (GMV) may provide the total value of merchandise sold through a particular merchant entity (e.g. e-commerce entity) over a certain time frame and provides a measure of growth. For characteristics which are difficult to compare, those may be converted to discrete or Boolean values in order to be normalized to a common comparison scale and allow an easier comparison between them. For example, when comparing a merchant's country to another, a discrete numerical value could be assigned to each country to allow for easy comparison. However the comparative difference value is generally nonsensical and difficult to interpret by the user. In such conversions, the meaning and dimensionality of the characteristics defining the entities is lost and thus, a comparison between the characteristics using the difference becomes meaningless and ineffective. Any recommendations which rely on such similarity comparisons which have lost the multidimensionality of the characteristics and/or converted characteristic values to a discrete scale are unpredictably reliable or nonsensical and the interest to the user is unclear or questionable.

Furthermore, the characteristics of entities may be completely unrelated to one another and thus difficult to have a way of comparing entities with multi-dimensional characteristics. For example, an e-commerce merchant with $100M GMV (gross merchandise value—i.e., total sales of merchandise over a given period, typically a year) and 2 orders/week more similar to a merchant with $10M GMV and 2 orders/week or a merchant with $100M GMV and 100 orders/week. This comparative exercise is made more difficult and incomprehensible by the further comparison of other potentially relevant discrete and unrelated characteristics that are associated with the entities.

In an embodiment, the present disclosure relates to a computer-implemented system and method that allows for an effective, accurate and dynamic comparison of multi-dimensional, discrete and/or unrelated characteristics between online entities, such as e-commerce merchants, to offer greater flexibility in the comparisons made between them and provide a more accurate determination of their similarity. In at least one embodiment, this determination further facilitates finding the most similar set of merchants to a merchant in order to make accurate recommendations.

In at least one aspect, the present application describes a computer-implemented method and system that measures a degree of similarity between two or more online entities (e.g. online e-commerce users or e-commerce web sites) by applying characteristics of each of the entities to a neural network and predicting a likelihood of interest in digital content (e.g. predicting interest in digital apps) for each of the entities. In said aspect, the similarity measurement between the entities is based on values of nodes of a middle layer of the neural network (NN) (which may be the single middle layer). This middle layer thus becomes a continuous space in which to embed the characteristics of each of the entities and provides a measure of their affinity for the particular digital content (e.g. since the middle layer generally takes into account both the input and the output). By measuring the distance between entities' values in this middle layer, a continuous space, entities can subsequently be clustered or ranked according to their similarity to each other despite being defined by discrete and unrelated characteristics. In at least one aspect, the clustering is performed based on similarity distance measurement such that each cluster of size X having an entity contained therein shows X-1 entities closest to that entity based on the similarity measure and a defined boundary for the cluster. At least in part based on the similarity measurement, similar entities once determined are used to recommend computer applications of interest.

An Example e-Commerce Platform

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one ora plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
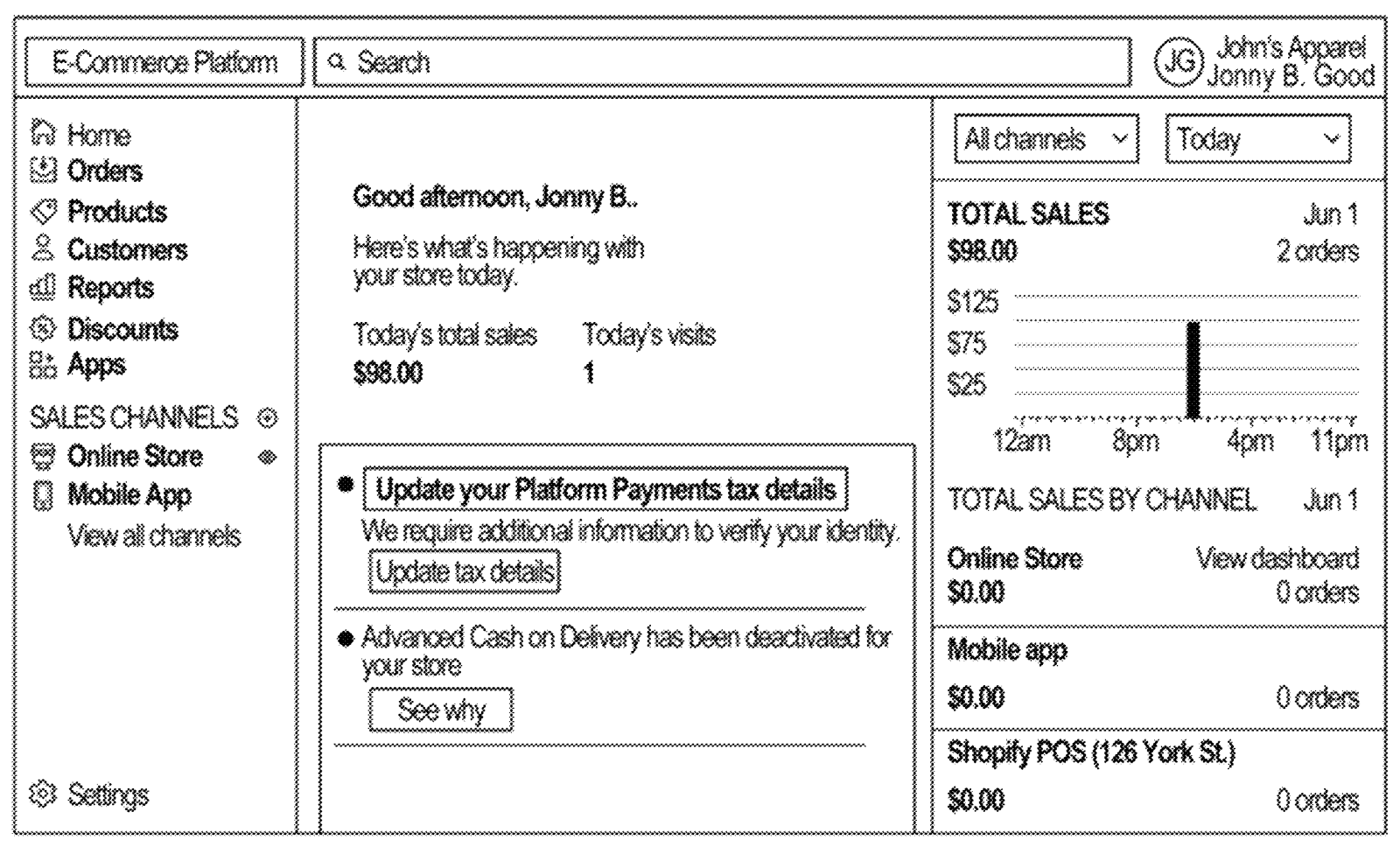

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible m is-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Application Store Recommendations

Figure 3:
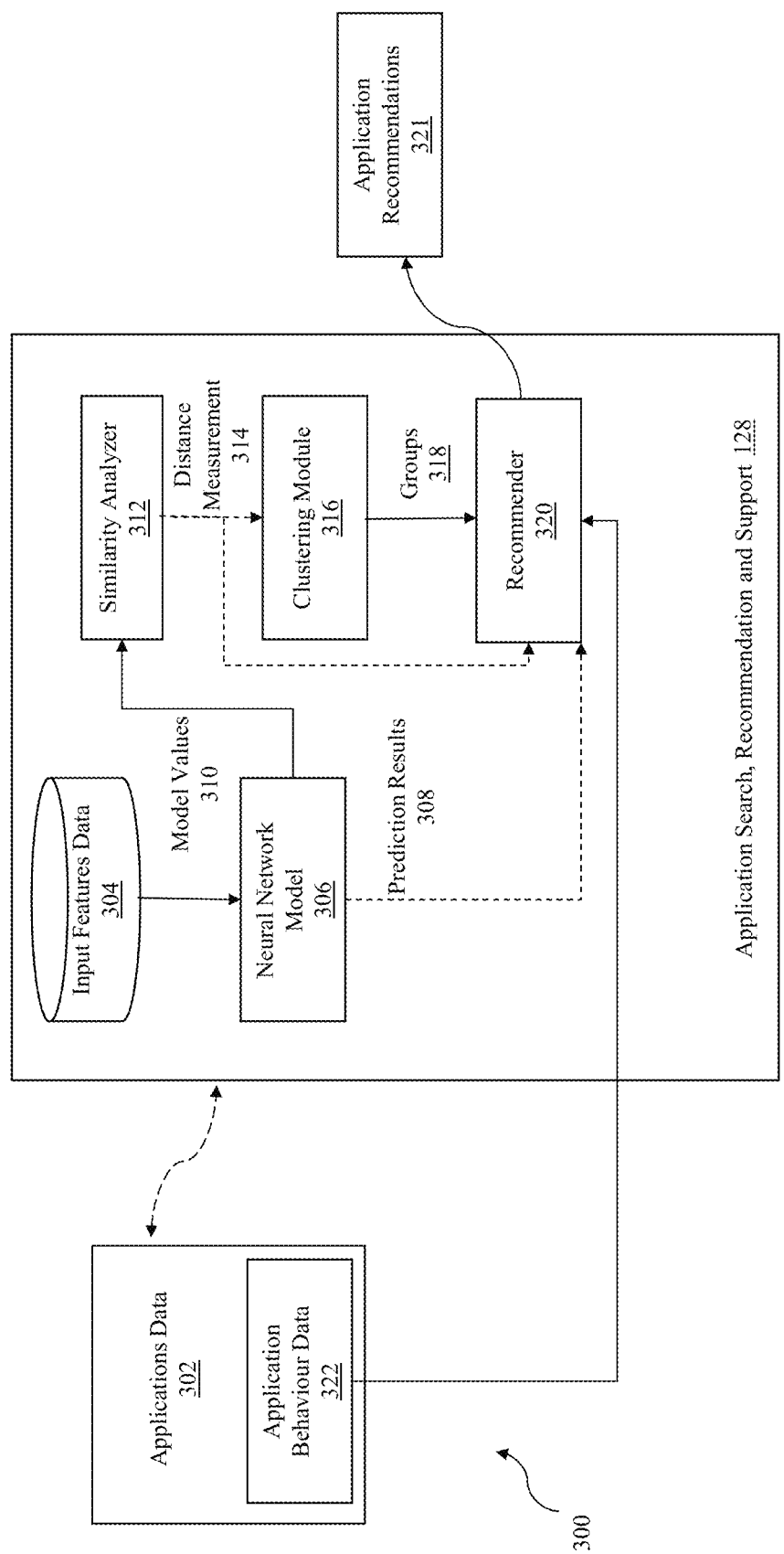
FIG. 3 is an example of an application search, recommendation and support platform, according to one embodiment.

Referring to FIG. 3, shown is an example recommendation system 300 including the application search, recommendation and support 128 platform of the e-commerce platform 100 in FIG. 1. The recommendation system 300 may implement at least some or the functionality described herein. The recommendation system 300 facilitates efficient generation of application recommendations for engaging entities online and resulting in download and interactivity of the suggested applications. As provided in the disclosure, this is further facilitated via the application search, recommendation and support 128 platform applying at least input characteristic features of the entities to neural networks in order to allow accurate, and comprehensive similarity measurement calculations drawn from node values of a hidden layer of the neural networks in order to determine similar entities and thereby dynamically generate the application recommendations. This allows multiple dimensions of entities to be captured and compared using the hidden layer's neural network values in a way that is not feasible with typical recommendation engines that are unable to reliably compare entities and thereby provide recommendations based on inaccurate comparisons.

The recommendation system 300 leverages knowledge derived from the entity's features applied to neural networks to provide a continuous or multidimensional space to calculate similarity measurements and provide an accurate representation of similarity in order to generate recommendations of applications of interest to an entity based on determining other similar entities.

Generally, the recommendation system 300 may be configured to run a neural network model (NN) on an entities' features (e.g. online merchant features) to predict their affinities for a separate entity (or more than one other entity). The recommendation system 300 may further be configured to retrieve a specific middle layer of the neural network model from the hidden layers, and use that layer as the continuous space within which to embed entities (e.g. online merchant shops) in space for distance measurement (similarity calculations).

Referring to FIG. 3, the application search, recommendation and support 128 receives applications data 302 which may be stored on an applications database on the e-commerce platform 100 and/or externally hosted on a network (e.g. application store) accessible by the system 300. The applications data 302 may include a plurality of applications and associated metadata such as application behaviour data 322 (e.g. download history, entities accessed by, entities searched for applications, other interactions of entities with the applications including historical timeline information for interactions and parties involved in interactions).

The recommendation system 300 may include a neural network model 306. An example of such a neural network model 306 is further depicted in FIG. 4. The neural network model 306 receives input features data 304 providing characteristics of entities. The neural network model 306 may be selected from: auto-encoders, convolutional neural networks (CNN), recurrent neural networks (RNN), and other models as may be envisaged.

Characteristics of an entity provided in the input features data 304 may include customer information, sale information, shop creation information, website information, currency information, credit card provider information, merchant name, merchant deal types, brand name, merchant deal type, sale values, shop status, payment information, social media information, account information, etc.

In some cases, the characteristics of a given entity are discrete (e.g. "Canada Post") which makes similarity difficult or impossible to determine (e.g. is "Canada Post" more like "USPS" or "FedEx"?). Furthermore, entity characteristics are often completely unrelated to each other which also makes similarity difficult to determine, e.g. is a merchant with $100M GMV and 2 orders/week more similar to the merchant with $10M GMV and 2 orders/week, or the merchant with $100M GMV and 100 orders/week? As an example of the above, an online merchant may have a set of discrete and unrelated characteristics such as: Primary payment processor: Stripe; Default carrier: Canada Post; GMV (total sales of merchandise): $122M; Average order volume per week: 55. Typically, the discrete and unrelated nature of these features results in the distance measurements being very crude, and therefore similarity results being less accurate and therefore less useful.

In at least some aspects, the set of input features data 304 provided by the input features data 304 to the neural network model 306 input layer may first be pre-processed to contain only features of relevance to the particular use of the recommendations made. For example, if the recommendations relate to computer applications of interest to entities, then the input features data 304 may be pre-filtered by the application search, recommendation and support 128 for that use. The application search, recommendation and support 128 may additionally store, in memory, a database of categories of data types and defined mappings to particular uses for the neural network model predictions.

According to the current disclosure, the similarity measure between entities is derived by applying the entities' features (e.g. as provided in the input features data 304) to the neural network model 306 and retrieving values from the model's hidden layer(s) to calculate similarity as will be described.

The neural network model 306 is a machine learning (ML) model comprised of multiple layers of nodes. An example of the neural network model 306 is further depicted in FIG. 4. The neural network model 306 includes a first input layer 402 receiving the set of inputs (e.g. input features data 304 for an e-commerce shop), an output layer 404 having the set of outputs (e.g. prediction results 308 for what the model is attempting to predict), and one or more middle or hidden layer(s) 403 providing a series of filters that each serve to recognize different characteristics of the incoming data in order to perform the prediction on the output. Once the neural network model 306 is trained, each of its nodes will have an associated weight and activation threshold. An activation function decides how to compute the input values of a layer into output values. A set of inputs (e.g. input features data 304) fed into the neural network model 306 will be multiplied by each of the node weights it encounters (provided that they meet the threshold (activation) requirement at that node) as it travels through the network toward the output node(s) of the output layer 404. The values that arrive as input to any given layer of the neural network model 306 are therefore uniquely based on the values initially given to the input layer. The neural network model 306 may be trained for a particular use relevant to the entities, such as for example predicting computer applications of interest. For example, the neural network model 306 may be configured to detect patterns in the input data (e.g. input features data 304) and produce an output (e.g. prediction results 308).

The neural network model 306 may further include a database of defined model parameters 406. The model parameters 406 may be hyper-parameters which are variables that determine the network model structure (e.g. number of neurons, number of hidden layers, activation function, optimizer, learning rate, etc.) and the variables which determine how the network is trained. The model parameters 406 may be defined before training (before optimizing the weights and bias).

In the example case where the entity is an online merchant, its input features data 304 provided to the input layer 402 might further include data such as preferred carrier, total GMV, and average weekly order volume. The input layer 402 of the neural network model 306 would receive the merchant's characteristics as input features data 304. In one aspect, the input features data 304 may be pre-filtered such that they are relevant to the particular use of interest (e.g. predicting an affinity to certain computer applications). Conveniently, neural networks have high accuracy even if input data has a significant amount of noise such that the hidden layer can still discover relationships in the data in order to produce the output even despite the noise. The output layer 404 of the neural network which provides the purpose of the network could be to predict the online merchant's interest in a given application (or set of applications) from an application store. This choice of output layer 404 would work in cases where the purpose of determining the similarity between the online merchants is, for example, to suggest recommendations for applications that this merchant may be interested in installing on their merchant website. Thus, it is preferable that the purpose of the neural network model 306 is related to the purpose of the similarity scores, i.e. if the reason for finding similar merchants is for computer application recommendations, then the neural network model 306 from which to pull out a hidden layer (e.g. from hidden layers 403) may be based on predicting the merchant's interest in one or more applications.

Similarity Distances Using Neural Networks

Figure 4:
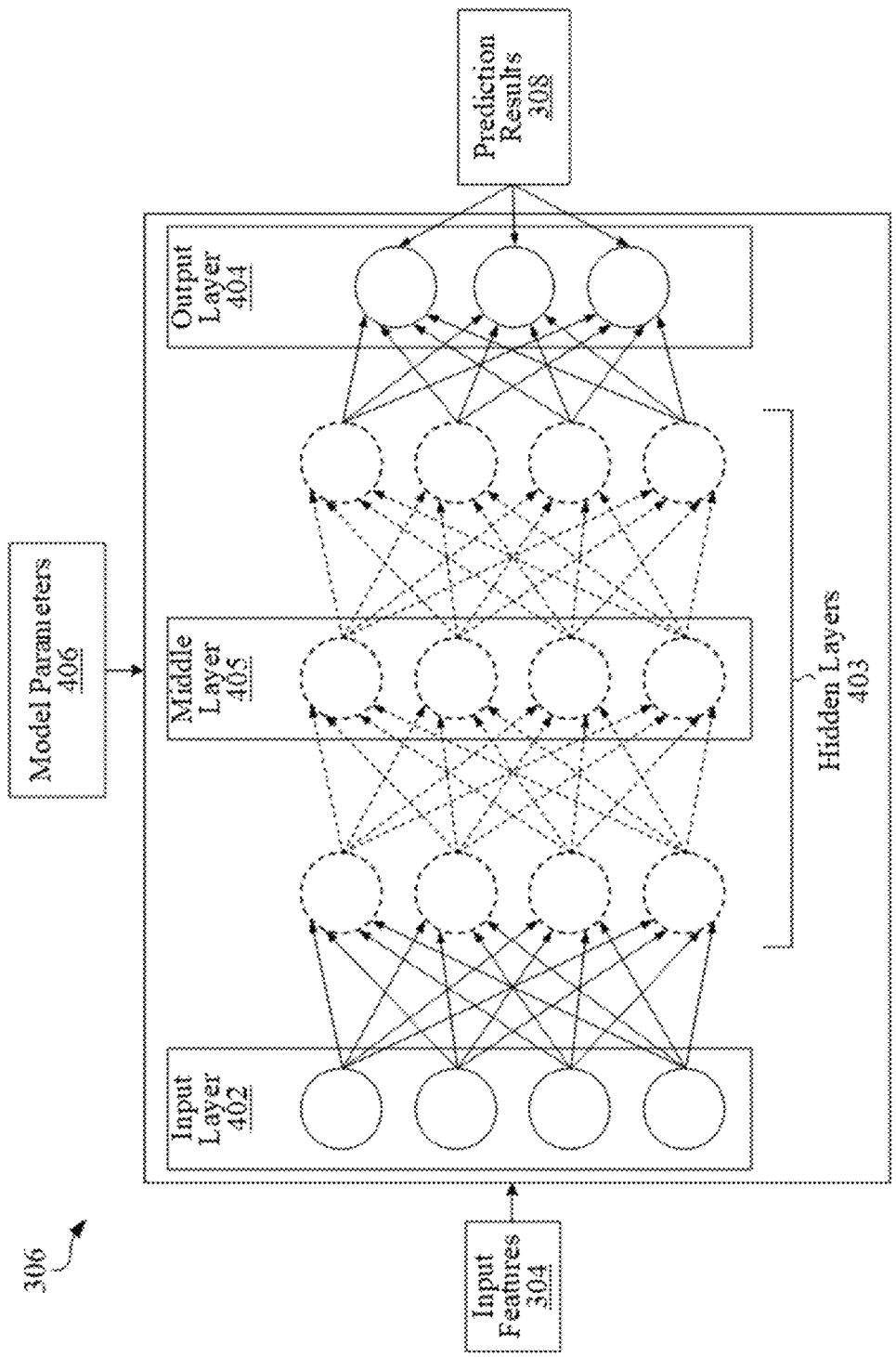
FIG. 4 is an example of a neural network model used for application recommendations in the platform of FIG. 3, according to one embodiment.

Referring to FIGS. 3 and 4, the recommendation system 300 further includes a similarity analyzer 312 for providing similarity distance measurement 314 based on receiving model values 310 of a middle layer or a selected hidden layer of the neural network model 306.

The similarity analyzer 312 is configured to automatically select one of the hidden layers 403 as a middle layer 405. In some aspects, the middle layer 405 may be physically located at a middle point between the input and output layer of nodes (e.g. as shown in the example of FIG. 4). In other aspects, the middle layer 405 may be the layer that is the smallest point of convergence of nodes before divergence begins again in the neural network model 306. In this case, the middle layer 405 may not be the middle by count (e.g. if 50 layers, it may not be layer 25), but may instead be the layer with the smallest number of nodes (e.g. input features=100 nodes as first layer, output features=1000 nodes as last layer, smallest middle layer might be layer 20 of 50 that has 40 nodes). In other aspects, the middle layer 405 may be selected through other techniques, such as initially selecting a few random (or regularly-spaced) sample layers and narrowing down to the optimal one from the random set, or selecting the last layer before the output layer, or by using other models to determine an optimal hidden layer to select.

Each entity's features may be run on the same neural network model 306 and then assigned a position in continuous or multi-dimensional space based on the calculated values of the nodes in the selected middle layer 405 when the neural network model is run on the entity's original set of features as defined in the input features data 304.

Figure 7:
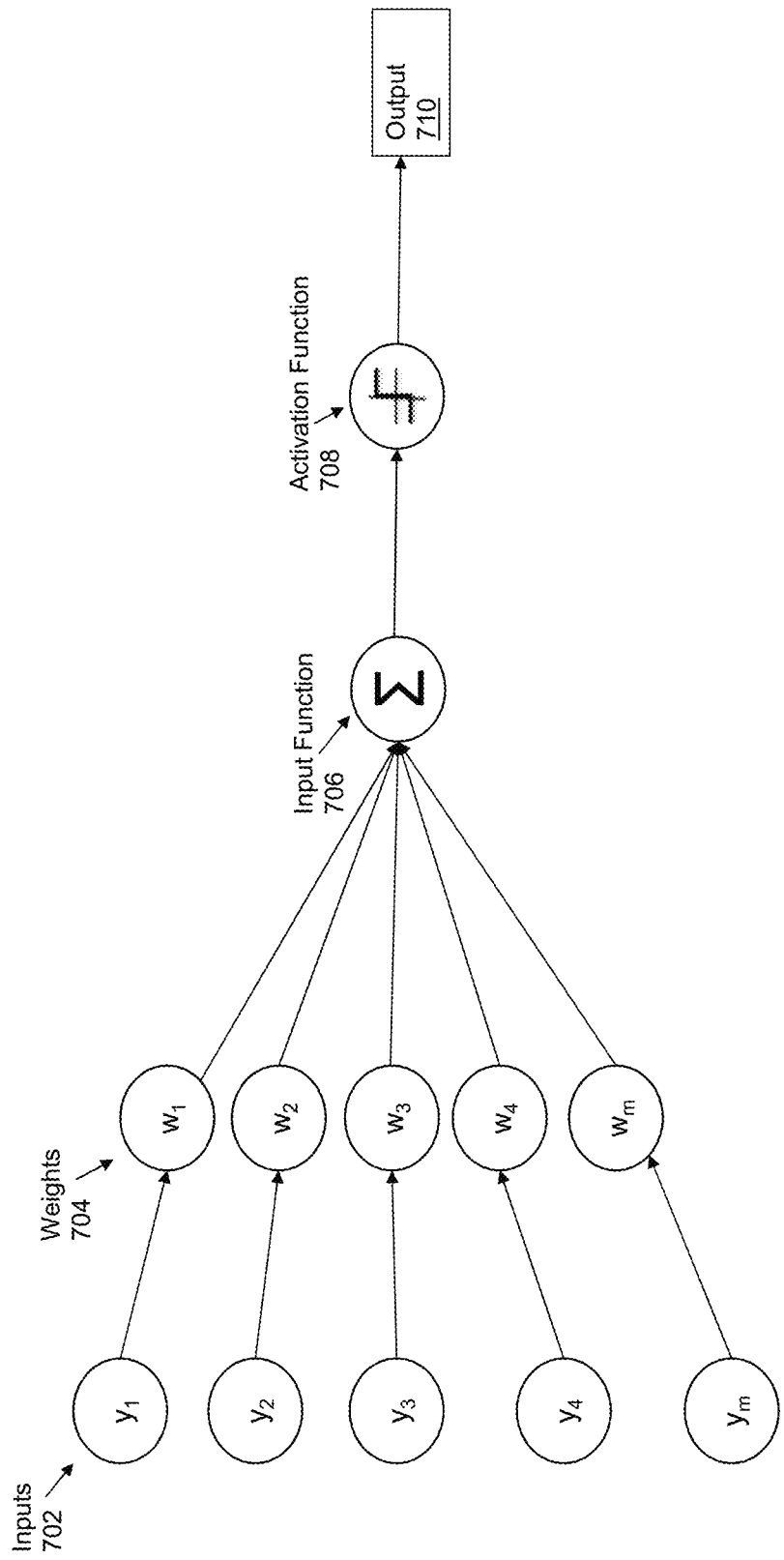
FIG. 7 shows an example diagram of components of a node in a middle layer of the neural network model of FIG. 4.

Referring to FIG. 7, shown is an example diagram of calculating the output value of a node such as the middle layer's (e.g. middle layer 405) node in the neural network model 306 of FIGS. 3 and 4 such as to subsequently perform the similarity distance by the similarity analyzer 312. As described above, the layers of the neural network model 306 are made of nodes. A particular node combines input, shown as inputs 702 received from a prior layer's nodes output with a set of weights 704 to amplify or dampen the input to assign an importance to the received inputs 702 with regard to a particular task that the neural network model 306 is attempting to learn (e.g. predicting computer applications of interest to entities). The weighted inputs are received at an input function 706 to be summed and then the resulting sum is passed through an activation function 708 to determine whether the received signal at the activation function should pass further through the network. If the signal is allowed to pass by the activation function, the neuron is activated and the output 710 is provided. Thus, in the case where the inputs 702 are for the inputs received at a given entity's middle layer 405, then the output values 710 provided from each node of the middle layer 405 are used by the similarity analyzer 312 to map to a continuous space and calculate a distance between the entities (e.g. a Euclidean distance).

Thus, the similarity analyzer 312 is configured to generate the distance measurement 314 between entities by first selecting a middle layer 405 for the entities to be compared and mapping the middle layer node values of the entities to a continuous space. The similarity analyzer 312 then uses the continuous space positions of all entities in the selected middle layer 405 (e.g. middle layer node values of the entities mapped to a continuous space) to calculate a distance measured in the continuous space. The distance calculation may be performed using a Euclidean distance or other quasi Euclidean measures of distance such as, for example, approximations thereof. The Euclidean distance is the straight line distance between two data points in a plane.

In other aspects, other types of distance metrics are used by the similarity analyzer 312 selected from but not limited to: Minkowski distance, Manhattan distance, Euclidean distance, Hamming distance, and Cosine distance. The type of distance used may further be automatically selected by the similarity analyzer 312 depending on the use of the machine learning model and the number of input/output nodes. For example, the Manhattan distance may be selected over the Euclidean metric as the dimensionality of the input data increases.

In some aspects, the similarity analyzer 312 may additionally calculate further similarity distances for additional hidden layers of the entities and then average all of the similarity distances to obtain an averaged amount as the distance measurement 314. In this case, the similarity analyzer 312 calculates other similarity distances between at least one additional hidden layer of the neural network 306 for the first entity and a corresponding hidden layer for the other entities of interest for comparison and then performs an average of the similarity distances for the middle layer and the other similarity distances calculated between the hidden layers to update the distance measurement 314.

In one aspect, the recommendation system 300 optionally further includes a clustering module 316 to receive the distance measurements 314 and may then cluster entities to form related groups 318 of entities based on their similarity. The clustering module 316 may use one or more clustering algorithms, including but not limited to: connectivity models (e.g. hierarchical clustering algorithm), centroid models (e.g. k-means clustering algorithm), distribution models, and density models. Further specifically, the clustering classifies the entities into similar groups by employing at one of: K-means nearest neighbor approach; spectral clustering; agglomerative clustering; affinity propagation; mean shift; density-based spatial clustering of applications with noise (DBSCAN); and ordering points to identify cluster structure (OPTICS). The groups 318 generated by the clustering module 316 and their characteristics (e.g. cluster size, cluster span, etc.) may be fed to a recommender 320.

In the case where the clustering module 316 is not used, the distance measurement 314 may be fed directly from an output of the similarity analyzer 312 to the recommender 320.

In some aspects, the distance measurements 314 between two or more entities' hidden middle layers 405 are ranked in a ranked list prior to inputting to the recommender 320. The recommender 320 may further be configured to provide a similar recommendation of computer applications to those entities ranked as having a similarity distance less than a defined threshold.

In one aspect, the similarity distances 314 and application behaviour data 322 which includes metadata about applications and its user interactions such as installation, high rating, frequent usage, active on the application daily, most recent download, applications downloaded to a user in a given time span, etc., are applied to the recommender 320.

Where an application recommendation is desired for a first entity, the recommender 320 is configured to identify a similar entity to the first entity having the shortest of the measured similarity distances (e.g. from the distance measurement 314) to the first entity. The recommender 320 utilizes the identified similar entity to the first entity and the application behaviour data 322 for that similar entity in order to generate the application recommendations 321.

The recommender 320 may further instruct a computing device associated with the first entity (e.g. example merchant device 502' shown in FIG. 5) to display the applications recommended and in some aspects, further instruct displaying a reasoning for suggesting the recommendations. This may include, for example, indicating on what basis the similar entity is similar to the first entity.

In some aspects, the recommender 320 may further receive the prediction results 308 from the neural network model 306. The prediction results 308 reflect the output node values of the trained neural network model 306 provided at the output layer 404. The prediction results 308 reflect a particular use for the neural network model 306, such as predicting an affinity for one or more computer applications. In some cases, once the similar entity is identified, the recommender 320 may further base recommendations on what predicted applications are of interest to the similar entity as in the prediction results 308 and thus suggest applications for the first entity in line with the similar entity's predicted applications. In other cases, the recommender 320 bases the recommendations 321 on identifying the similar entities to the first entity located in the groups 318 and retrieves actual application behaviour data 322 for those similar entities in order to suggest applications of relevance to the first entity.

For example, since two entities (e.g. online merchant websites) are considered more similar to each other if the calculated distance (e.g. distance measurement 314) between them is smaller, the shorter the distance between two entities, the more likely it is that the two entities will share similar responses to a particular recommendation (e.g. application recommendations 321). On that basis, an entity is predicted to respond well to an application recommendation 321 (and therefore serve as a good recommendation for that entity) if its closest related entity (e.g. k-nearest neighbour) is known to have a positive response to that same application. The positive response for the similar entity may be determined based on application behaviour data 322 for the application of interest (e.g. installation, high rating by a user such as a positive review, frequent usage, recently downloaded, etc.).

Figure 5:
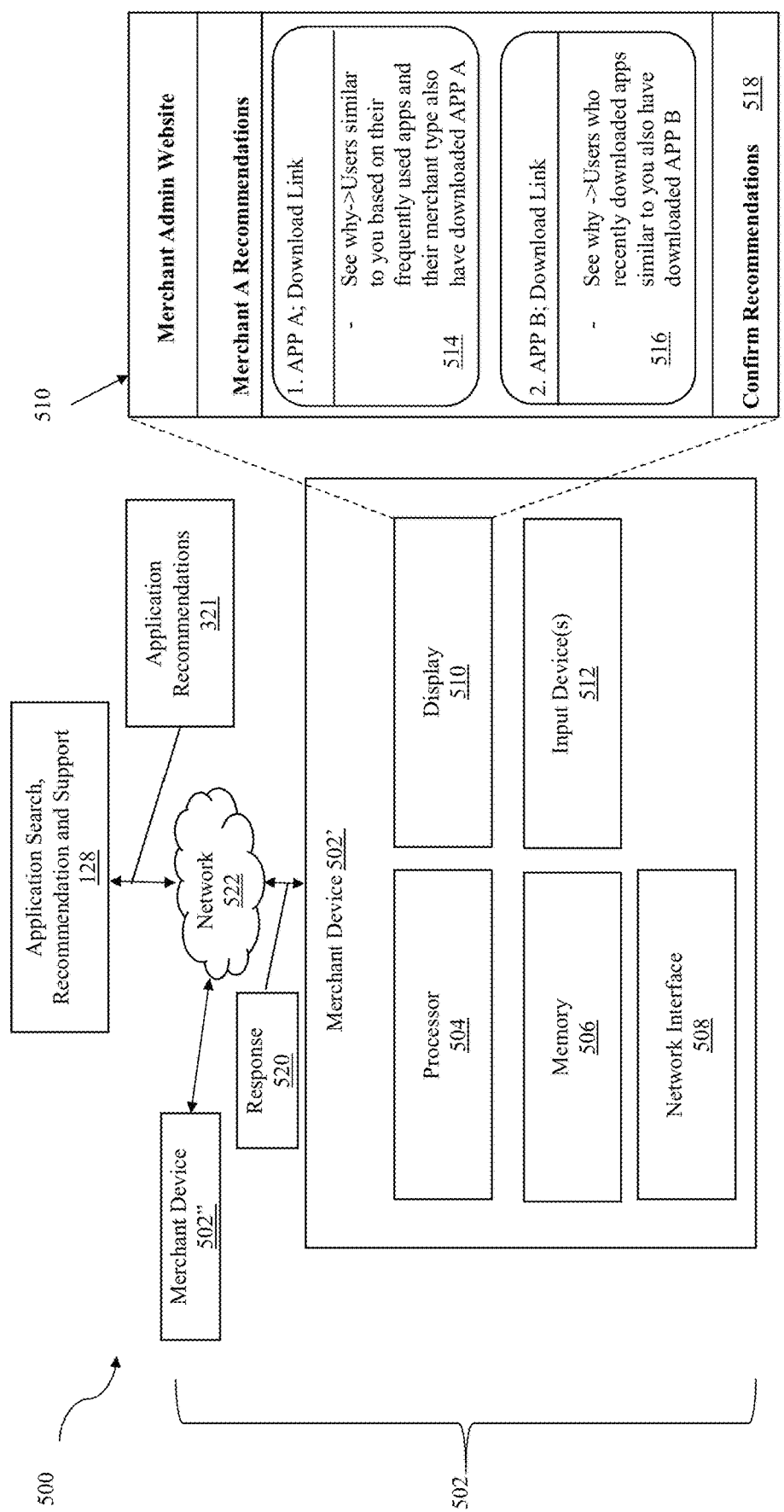
FIG. 5 is a block diagram of a computer network for providing application recommendations to at least one merchant device, according to one embodiment.

The modules of the application search, recommendation and support 128 shown in FIGS. 3 and 5 for generating the application recommendations 321 could be implemented in a variety of ways. For example, the modules relevant to generating the application recommendations 321 could be implemented by an e-commerce platform, either as a core function provided by the e-commerce platform, or by an application supported by the e-commerce platform.

Alternatively, the modules of the application search, recommendation and support 128 shown in FIGS. 3 and 5 for generating the application recommendations 321 could also or instead be implemented outside of an e-commerce platform and on a computing device. In some embodiments, the modules of the application search, recommendation and support 128 for generating the application recommendations 321 is implemented in part or in whole on a user device, such as the merchant device 502 shown in FIG. 5. For example, a software application may be installed on a user device that performs similarity analysis and recommendation generation locally (i.e., on the user device). The software application could download the input features data 304, applications data 302 including application behaviour data 322 from an external server.

Referring to FIG. 5, shown is an example computer network system 500, in which the application search, recommendation and support 128 of the e-commerce platform 100 shown in FIG. 1 is configured to communicate with one or more other computing devices, including one or more merchant devices 502' and 502" (collectively referred to as merchant devices 502), using a communication network 522. The merchant devices 502 are an example of a computing device having at least one processing device (e.g. a processor 504), storage devices (e.g. a memory 506) storing instructions which when executed by the processing device cause the computing device to perform operations, including displaying recommendations and/or downloading the recommended applications received from the application search, recommendation and support 128. The merchant devices 502 may further include a network interface 508 for communicating with other computing devices across the network 522. The merchant devices 502 further include one or more input device(s) 512 which may be used to interact with the recommendations displayed (e.g. for selection and requesting download thereof).

Referring to FIG. 5, the application search, recommendation and support 128 may provide application recommendations 321 and instruct the merchant device 502' to display the recommendation along with a description of a reasoning for the recommendation (e.g. see first view portion 514 and second view portion 516 respectively showing example recommendations and reasoning). The reasoning description may include: the recommendation based on an identified similarity between the first entity (e.g. merchant device 502') and the similar entity (e.g. merchant device 502"). The merchant device 502' may further display a description of an interaction of the similar entity (e.g. merchant device 502") with the other computer applications being recommended (e.g. see view portion 514 and 516). The application recommendations 321 provided from the application search, recommendation and support 128 may thus also include application behaviour data 322. In one example, a reasoning of why the recommendation has been made may further include a description of which entity the current entity is most similar to and the actions of the similar entity which have led to the current recommendation. Referring back to FIG. 3, once entities are grouped together as being similar to a first entity (e.g. in groups 318), a commonality of characteristics between them may be identified for each group as relevant to the particular use of recommendations and such commonality may be displayed in the reasoning for the similarity between the entities.

In the example of FIG. 5, an online e-commerce merchant (e.g. merchant device 502') may be provided with a recommendation for digital content of relevance to the entity (e.g. applications to download via application recommendations 321) based on determining that the merchant associated with merchant device 502' is most similar to e-commerce merchant B (e.g. merchant device 502") based on a similarity distance calculation performed on the hidden layer values in the neural network between the merchants (e.g. distance measurement 314 in FIG. 3). The recommendation, once displayed on the display 510 of the merchant device 502' may show that since e-commerce merchant B (e.g. merchant device 502") is most similar and has performed particular online activity (e.g. what applications they installed or most interacted with), then it is recommended that merchant A (e.g. merchant device 502') may want to do the same.

Referring again to FIGS. 3 and 5, the application search, recommendation and support 128 may instruct the display 510 of the merchant device 502' to display application recommendations in a first view portion 514 and a second view portion 516. In some cases, the application search, recommendation and support 128 may also provide instructions for the merchant device 502' to display a description of reasoning for the recommendations in the view portions 514 and 516. The reasoning may either be provided in the application recommendations 321 and/or derived from the application behaviour data 322 communicated from the application search, recommendation and support 128. Additionally, as shown in FIG. 5, the display 510 may be configured to display another user interface portion, shown as a third view portion 518 which allows a user to accept or reject one or more of the application recommendations 321 provided and displayed. The input received in the third view portion 518 is provided as a response 520 from the merchant device 502' to the application search, recommendation and support 128 to result in updating the application behaviours data 322 and thereby subsequent recommendations made to the merchant device 502' and/or other similar entities.

Figure 6:
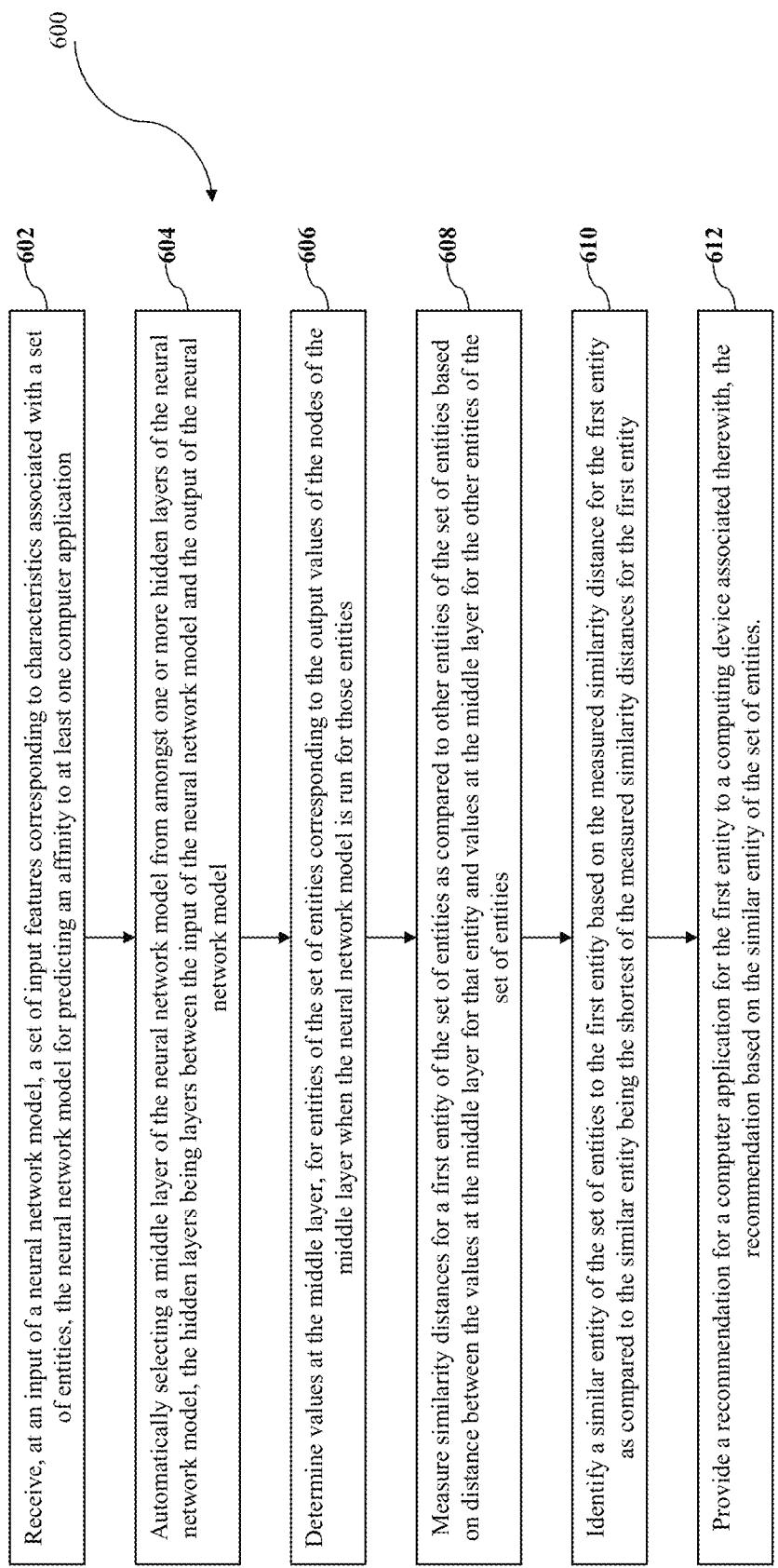
FIG. 6 shows an example flowchart of a method for determining similar online entities and generating application recommendations based on same, according to one embodiment.

FIG. 6 is a flowchart of operations 600 which may be performed by a computing device, such as the e-commerce platform 100 or as described above, on another computing device such as the merchant devices 102 or 502. The operations 600 are further described below with reference to FIGS. 1-7. The computing device may comprise a processor configured to communicate with a display to provide a graphical user interface (GUI) where the computing device has a network interface to receive various characteristics of entities including application behaviour information and wherein instructions (stored in a non-transient storage device), which when executed by the processor, configure the computing device to perform operations such as operations 600. The operations 600 select and generate recommendations of relevant computer applications for an entity based on determining similar entities to the entity and by utilizing a neural network's hidden middle layer to calculate similarity distances between the entities whereby the neural network receives characteristics of the entities at an input layer. The recommendations may then be displayed on a user interface of a computer associated with the entity (e.g. an online merchant or shop).

At step 602, operations include receiving at an input of a neural network model 306, input features for characteristics of entities where the neural network model 306 has been trained for predicting an affinity of entities to at least one computer application. The characteristics may be stored in the input features data 304 in the application search, recommendation and support 128. For example, characteristics relevant to the particular use of the neural network model (e.g. predicting interest in computer applications) may be selected as the input features data 304. In one example, the characteristics received at an input layer 402 may include but not limited to: a shop's preferred delivery carrier, total gross merchandise value (GMV), and average weekly order volume. The gross merchandise value is used in an online retail environment to indicate a total monetary value for merchandise sold over a particular time period through a particular online merchant. Training the neural network model may be performed using at least some of the data in the input features data 304 and/or applications data 302 including application behaviour data 322. For example, the training may be performed by using only a subset of the entity's features (e.g. apps currently installed by an entity) as the input data relevant to the use case (e.g. application recommendations). The training could be performed using methods known in the art and may be run on multiple samples for training. In one further example, the input layer 402 of the neural network model 306 may receive the online merchant's features and a purpose of the neural network model 306 and thus the output layer 404 may be to predict the merchant's interest in a given application as provided in the application store or potentially, a given set of applications. Other purposes may be envisaged for the neural network model 306. Preferably, the output of the neural network model 306 is related to the reasoning for determining the similar entities—e.g. providing recommendations of computer applications from an app store. Additionally, at least when compared to alternative methods that would not utilize a machine learning model, a trained neural network is better at predicting parameters of the input features for the online shops that result in successful recommendations of computer applications for the entities.

Following the operations at step 602, step 604 is next. Step 604 includes automatically selecting a middle layer (e.g. middle layer 405) of the neural network model 306 from amongst one or more hidden layers of the neural network model 306, the hidden layers being layers between the input of the neural network model and the output of the neural network model. This middle layer could be the middle layer 405 which may be either physically located at a midpoint between an input layer 402 and an output layer 404 or alternatively, it may be a particular layer from the hidden layers 403 that has the least number of nodes in the hidden layers 403, or alternatively it may be selected from the hidden layers 403 using other possible techniques.

Once the middle layer is selected at step 604, step 606 includes determining output values at the middle layer 405, for entities of the set of entities corresponding to the output values of the nodes of the middle layer 405 when the neural network model 306 is run for those entities. In one example, the middle layer 405 values for each entity may be assigned a position in a continuous space in order to allow more accurate comparison. An example method of calculating an output value for a middle layer node is described herein with respect to FIG. 7.

Following step 606, step 608 is next. Step 608 includes measuring similarity distances for a first entity of the set of entities as compared to other entities of the set of entities based on distance between the values at the middle layer 405 for that entity and values at the middle layer 405 for the other entities of the set of entities. The similarity distances may be calculated using the similarity analyzer 312 to generate the distance measurement(s) 314. The similarity distances may be calculated using a Euclidean distance measurement which calculates the distance between two points in the continuous Euclidean space by calculating the length of a line segment between the two points.

Following step 608, step 610 is next. Step 610 includes identifying a similar entity of the set of entities to the first entity based on the measured similarity distance for the first entity as compared to the similar entity being the shortest of the measured similarity distances for the first entity. The identification of the similar entities may occur in the recommender 320 or optionally, in the clustering module 316. Thus, in one aspect, the continuous space position of the entities in the middle layer 405 are used for distance calculations and to generate similarity scores to determine which entity is most similar to the first entity for which recommendations are to be generated. In some aspects, identifying a similar entity may include clustering or ranking entities based on their distances (e.g. using k-nearest neighbours).

Following step 610, step 612 is next. Step 612 includes providing a recommendation for a computer application for the first entity to a computing device associated therewith (e.g. merchant device 502'), the recommendation based on the similar entity of the set of entities. The recommendation may be provided across a computer network such as network 522. In some aspects, step 612 may further include an instruction to display the recommendation on the merchant device 502' as shown in FIG. 5 and/or an instruction to download the recommended application onto the merchant device 502'. Step 612 may be implemented by the recommender 320 to generate the application recommendations 321 which may be communicated to one or more merchant devices 502 shown in FIG. 5 for display thereon.

In one or more examples, the functions described may be implemented in hardware, software, firmware, or combinations thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including such media that may facilitate transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Furthermore, the elements depicted in the flowchart and block diagrams or other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

Various embodiments have been described. These and other embodiments are within the scope of the following claims.

The invention claimed is:

1. A computer-implemented method for providing recommendations of computer applications for entities, the method comprising:
receiving, at an input of a neural network model, a set of input features corresponding to characteristics associated with a set of entities, the neural network model for predicting an affinity to at least one computer application;
automatically selecting a middle layer of the neural network model from amongst one or more hidden layers of the neural network model, the one or more hidden layers being layers between the input of the neural network model and an output of the neural network model;
measuring similarity distances for a first entity of the set of entities as compared to other entities of the set of entities based on distance between values determined at the middle layer for that entity and values determined at the middle layer for the other entities of the set of entities, wherein the value determined at the middle layer for a given entity corresponds to output values of nodes of the middle layer when the neural network model is run for the given entity;
identifying a similar entity of the set of entities to the first entity based on the measured similarity distance for the first entity as compared to the similar entity being the shortest of the measured similarity distances for the first entity; and
providing a recommendation for a computer application for the first entity to a computing device associated therewith, the recommendation based on the similar entity of the set of entities.

2. The method of claim 1, further comprising: performing clustering of the entities based on the similarity distances between them in order to identify groups of entities related to one another, wherein the recommendation is further based on a commonality between entities of an identified group of entities including the first entity.

3. The method of claim 2, wherein the clustering classifies the entities into similar groups by employing at one of: K-means nearest neighbor approach; spectral clustering; agglomerative clustering; affinity propagation; mean shift; density-based spatial clustering of applications with noise (DBSCAN); and ordering points to identify cluster structure (OPTICS).

4. The method of claim 1, wherein the values at the middle layer for each entity is mapped to a position in a continuous multidimensional space and the distance calculated is a Euclidean distance measurement within that continuous multidimensional space.

5. The method of claim 4, wherein the neural network model is trained for a particular use of predicting interest of the entities in the at least one computer application from available applications, and the set of input features is processed to contain only features relevant to the particular use.

6. The method of claim 5 wherein the neural network model is an artificial neural network having at least one hidden middle layer.

7. The method of claim 5, further comprising, performing ranking of similarity distances between the first entity and other entities in the set of entities and providing a similar recommendation of computer applications of relevance to those entities ranked as having a similarity distance less than a defined threshold.

8. The method of claim 1, further comprising:
calculating other similarity distances between at least one additional hidden layer of the neural network model for the first entity and a corresponding hidden layer for the other entities of the set of entities; and
performing an average of the similarity distances for the middle layer and the other similarity distances calculated between the one or more hidden layers, wherein the provided recommendation is further based on the average.

9. The method of claim 1, wherein the recommendation for the first entity is further based on determining from the similar entity, at least one of: a set of output recommendations for other computer applications associated with the similar entity at an output of the neural network model; and identifying events indicating other computer applications interacted with or installed by the similar entity.

10. The method of claim 9, further comprising:
instructing the computing device to display the recommendation associated with a description of a reasoning for the recommendation, comprising:
the recommendation based on an identified similarity between the first entity and the similar entity; and a description of an interaction of the similar entity with the other computer applications.

11. The method of claim 1, wherein the middle layer of the neural network model automatically selected from amongst the one or more hidden layers of the neural network model is:
a particular layer located between layers corresponding to the input and the output that is a smallest point of convergence in the one or more hidden layers having a smallest number of nodes prior to a divergence in the neural network model; or
a layer situated in the middle of the hidden layers by count of a number of layers in the one or more hidden layers, where no smallest point of convergence exists in the neural network model.

12. A non-transitory computer readable medium having instructions tangibly stored thereon, wherein the instructions, when executed cause a system to:
receive, at an input of a neural network model, a set of input features corresponding to characteristics associated with a set of entities, the neural network model for predicting an affinity to at least one computer application;
automatically select a middle layer of the neural network model from amongst one or more hidden layers of the neural network model, the one or more hidden layers being layers between the input of the neural network model and an output of the neural network model;
measure similarity distances for a first entity of the set of entities as compared to other entities of the set of entities based on distance between values determined at the middle layer for that entity and values determined at the middle layer for the other entities of the set of entities, wherein the value determined at the middle layer for a given entity corresponds to output values of nodes of the middle layer when the neural network model is run for the given entity;

identify a similar entity of the set of entities to the first entity based on the measured similarity distance for the first entity as compared to the similar entity being the shortest of the measured similarity distances for the first entity; and provide a recommendation for a computer application for the first entity to a computing device associated therewith, the recommendation based on the similar entity of the set of entities.

13. A computer system for providing recommendations of computer applications for entities, the computer system comprising:

a processor in communication with a storage, the processor configured to execute instructions stored on the storage to cause the system to:

receive, at an input of a neural network model, a set of input features corresponding to characteristics associated with a set of entities, the neural network model for predicting an affinity to at least one computer application;

automatically select a middle layer of the neural network model from amongst one or more hidden layers of the neural network model, the one or more hidden layers being layers between the input of the neural network model and an output of the neural network model;

measure similarity distances for a first entity of the set of entities as compared to other entities of the set of entities based on distance between values determined at the middle layer for that entity and values determined at the middle layer for the other entities of the set of entities, wherein the value determined at the middle layer for a given entity corresponds to output values of nodes of the middle layer when the neural network model is run for the given entity;

identify a similar entity of the set of entities to the first entity based on the measured similarity distance for the first entity as compared to the similar entity being the shortest of the measured similarity distances for the first entity; and provide a recommendation for a computer application for the first entity to a computing device associated therewith, the recommendation based on the similar entity of the set of entities.

14. The system of claim 13, wherein the instructions cause the system to: perform clustering of the entities based on the similarity distances between them in order to identify groups of entities related to one another, wherein the recommendation is further based on a commonality between entities of an identified group of entities including the first entity.

15. The system of claim 14, wherein the clustering classifies the entities into similar groups by employing at one of: K-means nearest neighbor approach; spectral clustering; agglomerative clustering; affinity propagation; mean shift; density-based spatial clustering of applications with noise (DBSCAN); and ordering points to identify cluster structure (OPTICS).

16. The system of claim 13, wherein the values at the middle layer for each entity is mapped to a position in a continuous multidimensional space and the distance calculated is a Euclidean distance measurement within that continuous multidimensional space.

17. The system of claim 16, wherein the neural network model is trained for a particular use of predicting interest of the entities in the at least one computer application from available applications, and the set of input features is processed to contain only features relevant to the particular use.

18. The system of claim 17, wherein the instructions cause the system to: perform ranking of similarity distances between the first entity and other entities in the set of entities and provide a similar recommendation of computer applications of relevance to those entities ranked as having a similarity distance less than a defined threshold.

19. The system of claim 13, wherein the instructions further cause the system to:

calculate other similarity distances between at least one additional hidden layer of the neural network model for the first entity and a corresponding hidden layer for the other entities of the set of entities; and perform an average of the similarity distances for the middle layer and the other similarity distances calculated between the one or more hidden layers, wherein the provided recommendation is further based on the average.

20. The system of claim 13, wherein the recommendation for the first entity is further based on determining from the similar entity, at least one of: a set of output recommendations for other computer applications associated with the similar entity at an output of the neural network model; and identifying events indicating other computer applications interacted with or installed by the similar entity.

* * * * *